United States Patent [19]

Knight et al.

[11] 4,267,229
[45] May 12, 1981

[54] DECORATIVE ACRYLIC SHEETS AND ARTICLES FORMED THEREFROM

[75] Inventors: Peter A. Knight, Darwen; Janet P. Tilley, Welwyn, both of England

[73] Assignee: Imperial Chemical Industries Limited, London, England

[21] Appl. No.: 955,602

[22] Filed: Oct. 30, 1978

[30] Foreign Application Priority Data

Nov. 14, 1977 [GB] United Kingdom ............... 47283/77

[51] Int. Cl.$^3$ ............................................. B32B 27/00
[52] U.S. Cl. ................................. 428/324; 260/42.21; 264/331.18; 264/245
[58] Field of Search ................ 264/331, 245; 428/500; 260/42.21

[56] References Cited

U.S. PATENT DOCUMENTS

| | | | |
|---|---|---|---|
| 2,045,651 | 6/1936 | Hill | 264/331 |
| 2,238,446 | 4/1941 | Kuettel | 264/331 |
| 2,579,985 | 12/1951 | Varela | 264/331 |
| 3,821,138 | 6/1974 | Petke | 260/42.21 |

FOREIGN PATENT DOCUMENTS

| | | |
|---|---|---|
| 1462079 | 3/1962 | France . |
| 744863 | 8/1953 | United Kingdom . |
| 1080549 | 12/1965 | United Kingdom . |

*Primary Examiner*—George F. Lesmes
*Assistant Examiner*—E. Rollins Buffalow
*Attorney, Agent, or Firm*—Cushman, Darby & Cushman

[57] ABSTRACT

A colored acrylic sheet having an attractive 3-dimensional depth of color resulting from the use of a mixture of pigments or a pigment and a dye wherein an inorganic pigment, distributed non-uniformly throughout the sheet and a colorant is distributed uniformly through the sheet, the particles of non-uniformly distributed pigment being concentrated preferentially towards one surface of the sheet and are visible through the opposite surface of the sheet which is preferably substantially free from the non-uniformly distributed pigment. The attractive appearance is further enhanced by shaping the sheet and the sheet is particularly suitable for forming articles of sanitaryware.

14 Claims, No Drawings

DECORATIVE ACRYLIC SHEETS AND ARTICLES FORMED THEREFROM

This invention relates to acrylic sheet having an attractive decorative appearance.

The process of polymerising acrylic monomers or polymer in monomer syrups in cells, generally formed from glass plates, is well known. A wide variety of coloured acrylic sheets may be produced by dispersing pigments in the monomer or the syrup.

According to the invention there is provided a coloured acrylic sheet having dispersed therein a mixture of pigments or a pigment and a dye, said mixture comprising an inorganic pigment distributed non-uniformly throughout the sheet preferentially in the region of one of the surfaces of the sheet and a colourant selected from an organic pigment, organic dye or a non-sedimenting inorganic pigment, such as transparent iron oxide, distributed substantially uniformly throughout the sheet, the concentration of non-uniformly distributed inorganic pigment being sufficient to give a total luminous transmittance of 0–50% if the uniformly distributed colourant were absent from the sheet and the concentration of the uniformly distributed colourant being sufficient to give a total luminous transmittance of between 0 and 90% if the non-uniformly distributed inorganic pigment were absent from the sheet, the total luminous transmittance values being measured on sheet 5 mm in thickness according to the method of ASTM D1003-59T using Procedure B. The minimum concentration of the uniformly-dispersed colourant need only be sufficient to reduce the light transmission of the clear sheet by a small extent. Thus, the maximum total luminous transmittance of the coloured sheet in the absence of the non-uniformly dispersed inorganic pigment can be as high as 90% although it is preferred that there is sufficient colourant present to reduce the transmission substantially. Very attractive sheets can be produced where there is sufficient colourant present to reduce the total luminous transmittance to zero (measured in the absence of the non-uniformly dispersed inorganic pigment). The total luminous transmittance of the sheet of the invention is preferably lower than 10% and desirably is zero. Preferably, the non-uniformly dispersed inorganic pigment should be a material which reflects visible light, such as a finely divided metal pigment or a pearlescent pigment such as mica.

The concentrations of inorganic pigments and colourants required to give light transmission characteristics within the prescribed limits may readily be determined experimentally by applying ASTM D1003-59T to sheets prepared in the absence of the non-uniformly dispersed inorganic pigment and the colourant respectively.

By the term "acrylic sheet" is meant a sheet composed essentially of a polymer of methyl methacrylate and containing not more than 15% by weight of the polymer of units derived from other copolymerisable ethylenically unsaturated monomers. It is preferred that the other copolymerisable monomers, if any, should consist of alkyl acrylates containing up to 8 carbon atoms in the alkyl group. Small amounts of polyfunctional ethylenically unsaturated materials may be present when some degree of cross-linking is required in the sheet.

The sheet of the invention contains an inorganic pigment concentrated preferentially towards one surface of the sheet and a uniformly dispersed colourant giving a tinted transparent or translucent appearance to the other surface of the sheet. The net result is that when the sheet is viewed from the side which is not rich in inorganic pigment an apparently opaque layer is viewed through a depth of tinted transparent or translucent sheet. The general visual impression is of a 3-dimensional depth of colour.

This attractive 3-dimensional depth of colour is apparent even though the concentration of uniformly dispersed colourant may be so high as to give a substantially opaque sheet (in the absence of the non-uniformly dispersed inorganic pigment), as measured on a sheet 5 mm in thickness.

The visual appearance may be enhanced further when the sheet is stretched by forming into an article, such as an article of sanitaryware.

The attractive visual effect obtained with the sheet of the invention appears to result from the distribution of the opacifying inorganic pigment within the sheet. By contrast, if an opaque layer is applied to the back of a coloured translucent or transparent sheet a less attractive appearance is obtained than from the sheet of the present invention. Similarly, if an opaque layer is applied to the back of a coloured, translucent or transparent sheet which has been stretched to form a shaped article the appearance is less attractive than a similar shaped article formed from a sheet of the present invention which has an opacifying pigment dispersed in the sheet. The present invention also has advantages over the method of applying an opaque layer to a transparent or translucent sheet in that it provides more versatility, for example it is more convenient to have the opacifying means embedded within the sheet, rather than applying it as a superficial coating, because thermoforming such a coated sheet may be difficult or even impossible without breaking the coating.

The sheet of the invention is produced by selecting appropriate inorganic pigments, organic pigments and dyes for use in the conventional process of producing arcylic sheet by polymerising in a closed cell of the desired thickness. In the conventional process pigments or dyes dispersed or dissolved in an appropriate media such as acrylic monomer are introduced into the bulk of the monomer to be polymerised. In a first stage this uniform mixture is partially polymerised using a free radical initiator in a stirred reaction vessel until the viscosity of the mixture has reached a value of about 0.5–15 poise. This syrup is then transferred to a cell, conventionally formed from a pair of glass plates which define the thickness of the sheet to be formed. The cell is maintained at a temperature between 40° C. and 120° C. until polymerisation is substantially complete. The conditions normally used ensure that the pigments or dyes remain essentially uniformly dispersed throughout the polymerising mixture.

According to a further aspect of the invention there is provided a process of forming a coloured acrylic sheet in which a polymer-in-monomer syrup containing a mixture of pigments or a pigment and a dye is polymerised characterised in that the syrup contains 1) a uniformly dispersed colourant selected from an organic pigment, organic dye or a non-sedimenting inorganic pigment and 2) an inorganic pigment said syrup being introduced into a cell for forming a sheet disposed with the plane of the cell in the horizontal position and is polymerised under conditions wherein a sheet is produced in which the colourant is uniformly dispersed and the inorganic pigment has sedimented at least partially towards the bottom of the sheet.

In preparing sheet according to the present invention the colouring system present in the polymerising mixture comprises an inorganic pigment selected to have physical characteristics to ensure that it sediments towards the bottom surface of the sheet when the major plane of the polymerising sheet is maintained in a horizontal position. Inorganic pigments suitable for this purpose generally have an average particle size between 1 and 50 microns. The inorganic pigment should be used at a sufficient concentration to reduce the transmission of visible light of the sheet to 0–50% as determined by ASTM D1003-59T.

The inorganic pigment should be distributed in the fully polymerised sheet so that one half of the thickness of the sheet contains at least 60% and preferably at least 75% by weight of the non-uniformly distributed inorganic pigment. It is desirable that at least 85% of the pigment is concentrated in one half of the thickness of the sheet and that the major proportion of this should be in one tenth of the thickness adjacent one surface of the sheet. When the pigment is a metallic pigment or a pigment of large particle size, for example of average particle size between 35 and 50 microns, the pigment may be concentrated as a continuous layer adjacent one surface of the sheet but in such circumstances the 3-dimensional effect achieved by distributing the inorganic pigment in at least part of the sheet may not be obtained. In addition, the presence of a continuous layer of pigment on one surface of the sheet may give rise to cracking of the layer if the sheet is thermoformed into a shaped article. The concentration of inorganic pigment required to give a transmission value within the required range is generally within the range 0.05% to 5% by weight of the sheet. The preferred range is between 0.25% and 3% by weight but will vary to some extent depending on the nature of the pigment.

In addition there should be present an organic pigment or dye or an inorganic pigment which has been stabilised so that it will remain dispersed substantially uniformly throughout the sheet during the polymerisation cycle. Techniques for treating inorganic pigments so that they remain dispersed during the polymerisation are known to those skilled in the art. Suitable concentrations of organic pigments or dyes are as low as 0.0001% or even lower. In the case of stabilised inorganic pigments, such as transparent iron oxides, the concentrations may be as high as 0.25%.

When viewed from the surface of the sheet which was maintained as the uppermost surface during the polymerisation procedure the opacity conferred by the at least partially sedimented inorganic pigment confers an attractive appearance and depth of colour to the remaining transparent or translucent portion of the sheet. It is desirable that a thickness of the sheet on this uppermost side of the sheet, for example at least the outer one tenth of the uppermost side, remote from the side in which the inorganic pigment is concentrated, is substantially free from the inorganic pigment. The appearance is particularly attractive when the organic pigment, dye or non-sedimenting inorganic pigment is used in conjunction with a non-uniformly dispersed inorganic pigment which reflects light such as a finely divided metal pigment or a pearlescent pigment. Metal pigments may be present in combination with pearlescent pigments. Inorganic pigments which may be used in the process of the invention include metal pigments of the type classified as Colour Index Pigment Metal 1 and 2, metal oxides, metal sulphides, metal sulphates, calcined inorganic complexes and ultramarines. The pigments known as pearlescent pigments may be any of those available from pigment manufacturers such as those based on ground fish scales, lead carbonate, bismuth oxychloride or the titanium dioxide or iron oxide treated mica platelets.

The organic pigments, dyes or non-sedimenting inorganic pigment used for the colourant may be any material which will remain substantially uniformly dispersed in the polymerisation process. A wide variety of materials may be used depending on the colour required. Typical of the organic pigments are phthalocyanines, quinacridones and endanthrones. Typical of the organic dyes are anthraquinones, monoazo and diazo dyes and perinones. Typical of inorganic pigments which can be made in non-sedimenting form are the transparent iron oxides or cadmium sulphide. The polymerisable mixture containing the colouring system may include any of the other auxiliary materials which are normally present in acrylic sheet such as heat and light stabilisers.

The products of the invention are suitable for use as flat sheets but the attractive nature of the upper as-polymerised surface makes it a very suitable material for forming articles of sanitaryware by the known shaping processes. These processes require the sheet to be stretched to shape with consequent thinning of the most highly stretched areas of the sheet. This operation can give rise to further attractive colour effects where the variation in thickness of the sheet gives rise to a graduated or shaded colour effect. Shaped sheets used as sanitaryware may be reinforced in known manner with polyester/glass fibre compositions or may be sufficiently thick to withstand normal usage without reinforcement.

The invention is further illustrated by the following examples. In the examples the percentages of the ingredients are percent by weight of the monomer charge.

EXAMPLE 1

Methyl methacrylate monomer containing 0.02% azodiisobutyronitrile, 1% of a pigment of the class Colour Index Pigment Metal 2, sold as Duragold Pale MM 12652, 0.01% anthraquinone red, 0.01% perinone, 0.005% anthraquinone blue was polymerised in a stirred vessel at 80° C. until the polymer content of the mixture had reached 8% by weight of the monomer charged. The syrup was transferred to a cell formed from glass plates and designed to give a sheet 5 mm in thickness when the monomer was fully polymerised. After allowing the cell to stand for 1 hour with the major plane of the cell in a horizontal position polymerisation was completed by raising the temperature of the cell of 60° C. for a period of 6 hours followed by 2 hours at 100° C.

The fully polymerised sheet was removed from the cell after cooling. The lower surface of the sheet, in the as-polymerised position, had a metallic appearance showing that the metal pigment had sedimented strongly towards this surface. When viewed from the other side of the sheet the sedimented metallic layer imparted an attractive 3-dimensional effect to the coloured transparent thickness of the sheet above the sedimented layer. The total luminous transmittance measured using ASTM 1003-59T, Procedure B was 0%. The value for an identical sheet but prepared in the absence of the colourants was also 0%.

The sheet was thermoformed into a bath blank by heating the sheet in an oven at 165% before stretching the sheet to the desired shape with the side showing the 3-dimensional effect forming the working surface. The sheet retained its attractive 3-dimensional appearance. At the same time further attractive visual effects were introduced in the areas where the sheet has been subjected to the greatest stretching.

EXAMPLE 2

The general procedure of Example 1 was repeated using a colouring system in which the metallic pigment was replaced by 2% of a pearlescent mica pigment. The extent of sedimentation of this pigment was not as great as with the metallic pigment of Example 1 but gravimetric analysis showed that more than 85% of the mica pigment had sedimented to the lower half of the sheet and that the upper 10% of the thickness of the sheet was substantially free from the mica pigment.

The sheet was formed into a bath blank as described in Example 1. To assess the effect of the presence of the pigment system on the surface quality of the sheet the bath blank was demoulded by heating to 165° C. and then re-shaped into a bath with the opposite side of the sheet forming the working surface of the bath. The surfaces of the sheet were examined and were found to be free from cracks or splits.

In a comparative experiment the procedure of Example 2 was repeated except in that the polymerisation was commenced as soon as possible after filling the cell. The standing time was, therefore, less than ½ hour. The fully polymerised sheet was found to have a much less attractive appearance than the sheet where sedimentation had been allowed to occur. The sheet had the appearance of a conventional uniformly coloured sheet and there was no evidence of a 3-dimensional colour effect.

EXAMPLE 3

The procedure of Example 1 was repeated using 2% by weight of a white pearlescent mica pigment as the inorganic pigment and 0.004% by weight of quinacridone red as an organic pigment which is to remain uniformly dispersed. The sheet was polymerised under the conditions given in Example 1. A sheet having an attractive 3-dimensional appearance was produced.

EXAMPLE 4

The procedure of Example 1 was repeated using 1% by weight of a white pearlescent mica pigment as the inorganic pigment and 0.004% by weight of quinacridone red. Control experiments using (a) 1% of the mica pigment alone and (b) 0.004% by weight of the quinacridone red alone were carried out. The sheet containing both the mica and the quinacridone red had a very attractive appearance and depth of colour and had a total luminous transmittance of 0%. The sheet containing the mica alone had a transmittance of 12% and the sheet containing the dye only had a transmittance of 0.4%.

EXAMPLE 5

The procedure of Example 4 was repeated using a mica pigment concentration of 0.5% by weight and a quinacridone red concentration of 0.0013%. The sheet containing both mica and colourant had a total luminous transmittance of 0.16%. The sheet containing mica alone had a transmittance of 20% and the sheet containing colourant alone had a transmittance of 1.1%.

COMPARATIVE EXAMPLE A

A blue coloured transparent poly(methyl methacrylate) sheet available from Imperial Chemical Industries Limited as 'Perspex' Blue 706 having a thickness of 12 mm, a length of 1750 mm and a width of 700 mm was heated for 40 minutes in an air circulating oven. The softened sheet was then shaped into a bath by laying it over a vacuum mould, clamping the edges of the sheet and applying vacuum. The 'Perspex' shell thinned down to a thickness of less than 2 mm in some parts and in these areas the original blue tinted colour appeared less intense.

In order to accentuate the colour gradation effect so formed, two coats of Plastipure PP023 (sold by the Sericol Group Limited, London), an acrylic based spray paint was applied to the whole of the underside surface of the bath to provide an opaque coating. Although the variation in the sheet thickness gave rise to a variation in colour in the bath the attractive 3-dimensional depth of colour obtained with sheet according to the invention was absent.

We claim:

1. A coloured acrylic sheet having dispersed therein a mixture of pigments or a pigment and a dye, characterised in that said mixture comprises an inorganic pigment which is distributed non-uniformly throughout the sheet and concentrated preferentially towards one surface of the sheet and a colourant selected from an organic pigment, organic dye or a non-sedimenting inorganic pigment distributed substantially uniformly throughout the sheet, the concentration of non-uniformly distributed inorganic pigment being sufficient to give a total luminous transmittance of 0-50%, if the uniformly distributed colourant were absent from the sheet, and the concentration of the uniformly distributed colourant being sufficient to give a total luminous transmittance of between 0 and 90%, if the non-uniformly distributed inorganic pigment were absent from the sheet, the total luminous transmittance values being measured on sheet 5 mm in thickness according to the method of ASTM D1003-59T using Procedure B, wherein a 3-dimensional depth of colour is visible through the surface of the sheet that is opposite the surface where the non-uniformly distributed inorganic pigment is preferentially concentrated.

2. A coloured acrylic sheet according to claim 1 characterised in that the concentration of uniformly distributed colourant is sufficient to give a total luminous transmittance of between 0 and 10%, if the non-uniformly distributed inorganic pigment were absent from the sheet.

3. A coloured acrylic sheet according to claim 1 in which one half of the thickness of the sheet contains at least 60% by weight of the non-uniformly distributed inorganic pigment.

4. A coloured acrylic sheet according to claim 1 in which one half of the thickness of the sheet contains at least 75% by weight of the non-uniformly distributed inorganic pigment.

5. A coloured acrylic sheet according to claim 1 in which one half of the sheet contains at least 85% of the non-uniformly distributed inorganic pigment and the major proportions of this is present in one tenth of the thickness of the sheet adjacent one surface of the sheet.

6. A coloured acrylic sheet according to claim 1 in which the outer one tenth of the side of the sheet, remote from the side in which the non-uniformly distributed inorganic pigment is concentrated, is substantially free from the inorganic pigment.

7. A coloured acrylic sheet according to claim 1 in which the non-uniformly dispersed inorganic pigment is selected from finely divided metal pigments of the type classified as Colour Index Pigment Metal 1 and 2, metal oxides, metal sulphides, metal sulphates, calcined inorganic complexes, ultramines and pearlescent pigments.

8. A shaped article formed from a coloured acrylic sheet according to claim 1.

9. A coloured acrylic sheet according to claim 1 in which the uniformed dispersed colourant is selected from phthalocyanine, quinacridone and endanthrone organic pigments, anthraquinone, perinone, monoazo or diazo organic dyes and non-sedimenting inorganic pigments.

10. A coloured acrylic sheet according to claim 1, wherein the total luminous transmittance of the sheet is zero.

11. A coloured acrylic sheet according to claim 10, wherein:
   (a) the inorganic pigment which is distributed non-uniformly throughout the sheet is an opacifying inorganic pigment;
   (b) the uniformly dispersed colorant gives a tinted transparent or translucent appearance to the surface of the sheet opposite the surface where said opacifying inorganic pigment is preferentially concentrated; and
   (c) said opacifying inorganic pigment gives an opaque layer which is visible through a depth of the tinted transparent or translucent surface.

12. A coloured acrylic sheet according to claim 1 formed by a process in which a polymer-in-monomer syrup containing a mixture of pigments or a pigment and a dye is polymerised characterised in that the syrup contains (i) a uniformly dispersed colourant selected from an organic pigment, organic dye or a non-sedimenting inorganic pigment and (ii) an inorganic pigment said syrup being introduced into a cell for forming a sheet disposed with the plane of the cell in the horizontal position and is polymerised under conditions wherein a sheet is produced in which the colourant is uniformly dispersed and the inorganic pigment has sedimented at least partially towards the bottom of the sheet so that the inorganic pigment is distributed throughout the sheet but is concentrated preferentially towards a lower surface of the sheet.

13. A shaped article according to claim 8 which is shaped by a process comprising stretching of a flat sheet.

14. An article of sanitaryware formed from a coloured acrylic sheet wherein the sheet contains a uniformly dispersed colourant selected from organic pigments, organic dyes or a non-sedimenting inorganic pigment and a non-uniformly dispersed inorganic pigment which is contained predominantly within the half of the thickness of the sheet which forms the underside of the article of sanitaryware, the concentration of uniformly dispersed colourant being such that the inorganic pigment is visible through the exposed surface of the sheet.

* * * * *